M. Wrangle,
Casting Hollow-Ware.
Nº 22,476.        Patented Dec. 28, 1858
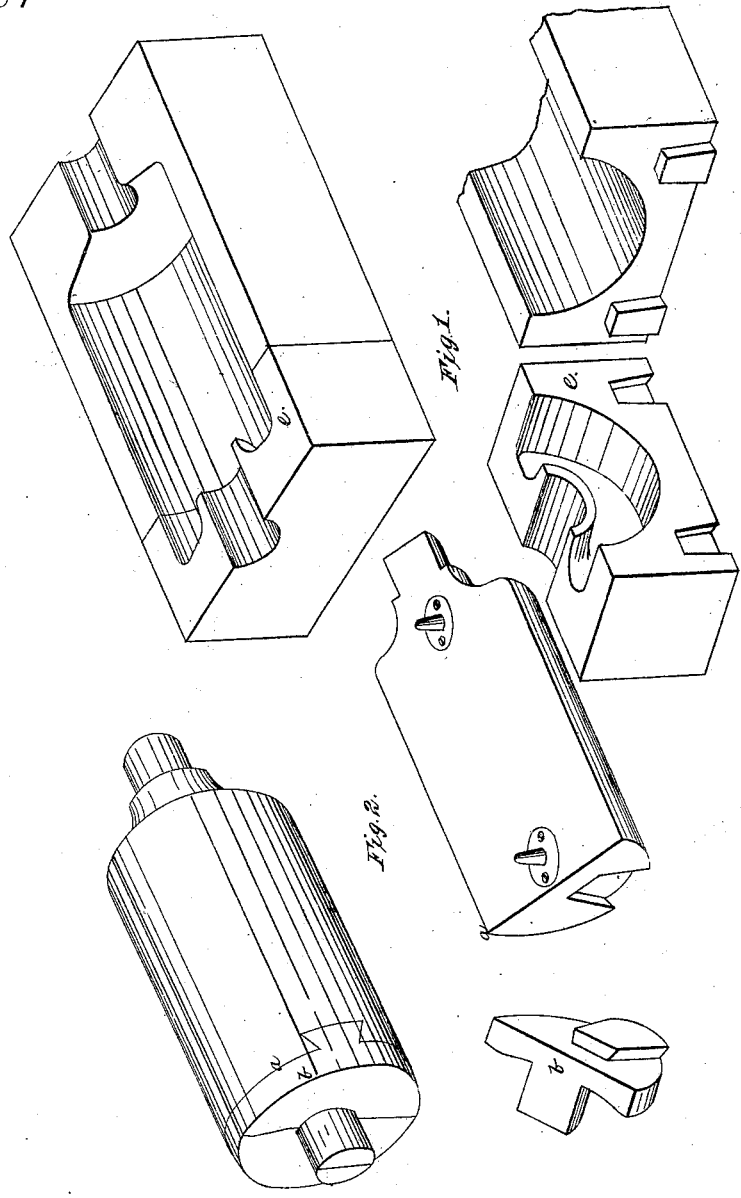
Witnesses:
Inventor:
Moses Wrangle

UNITED STATES PATENT OFFICE.

MOSES WRANGLE, OF NEW YORK, N. Y., ASSIGNOR TO HUNTER, KELLER & CO., OF SAME PLACE.

IMPROVED CAST-IRON MERCURY-BOTTLE.

Specification forming part of Letters Patent No. 22,476, dated December 28, 1858.

*To all whom it may concern:*

Be it known that I, MOSES WRANGLE, of the city, county, and State of New York, have invented or devised certain new and useful Modes or Patterns for Casting Iron Bottles for Holding Mercury; and I do hereby declare and ascertain the same, referring to the accompanying drawings, in which—

Figure 1 is the core-box. Fig. 2 is the pattern from which the mold is formed.

In making a malleable-iron bottle after the plan of I. G. Johnson it is important that it should be made to stand on end for this purpose. The best form is a concave bottom which I have devised, together with the mold and core-patterns necessary to mold said bottle with the concave bottom aforesaid.

For the purpose of molding a concave bottom on the bottle aforesaid it becomes necessary to have certain specific divisions of the pattern and core-box in order to mold the same, with such fastenings as shall hold them in position, and steady and direct their separation at the proper time, so as to insure the practical and successful preparation of mold and core for the very thin casting required for the purpose specified. For this purpose I form the pattern, Fig. 2, conforming to the shape of the article, and parted, as usual, in the middle longitudinally. I then cut the pattern off at right angles at $a$, the lower portion, $b$, that forms the concave, being connected with the upper part by a dovetail or other convenient fastening, as seen in the figure. In the same way I form the core-box, Fig. 1, by cutting off the lower section, $e$, so that when the mold or core is formed the upper part can be lifted off, and then the lower part forming the concave bottom can be removed laterally and the concavity thus secured.

Having thus described my mode of forming iron bottles, what I claim, and desire to secure by Letters Patent, is—

Molding iron mercury-bottles with concave bottoms by means of the patterns substantially as herein described.

In witness whereof I have hereto set my hand this 2d August, 1858.

MOSES WRANGLE.

In presence of—
 SYLVESTER LAY,
 ALB. H. HOOK.